UNITED STATES PATENT OFFICE.

SAMUEL GOLDREICH, OF LONDON, ENGLAND, ASSIGNOR TO THE BARK SYNDICATE LIMITED, OF LONDON, ENGLAND.

PROCESS FOR THE MANUFACTURE OF FOOD PRODUCTS AND PRODUCTS OBTAINED THEREBY.

1,178,795.     Specification of Letters Patent.     Patented Apr. 11, 1916.

No Drawing.     Application filed November 24, 1915. Serial No. 63,214.

*To all whom it may concern:*

Be it known that I, SAMUEL GOLDREICH, a subject of the King of the United Kingdom of Great Britain and Ireland, and residing at 12 Canfield Gardens, London, N. W., England, have invented certain new and useful Improvements in and Relating to Processes for the Manufacture of Food Products and the Products Obtained Thereby, of which the following is a specification.

This invention relates to processes for the manufacture of food products from mixtures of ground cereals and ground peanuts from which a portion of the oil has been expressed, and the invention consists in an improved process for the manufacture of such products and in the new products obtained thereby, the object of the invention being to produce a cheap food for human consumption having substantially the same percentage of fat and proteins as rump steak, and having more food (*i. e.* digestible) units than rump steak, and a cheap food for dogs and other animals of less food value than that referred to above.

According to the present invention, maize (without or with the cob) is ground, and to the ground maize or maize-on-cob is added ground peanut cake—or "peanut cake meal" as it is termed—from which has been expressed only the first or "cold" expression of oil, that is to say, peanut cake containing about 20 to 25% oil and 30 to 35% protein is ground and added to the ground maize or ground maize-on-cob, the quantities of the ingredients of the mixture being so chosen that the final products will contain the percentages of oil, proteins and carbohydrates which are hereinafter specified. To the ground maize or ground maize-on-cob there is added some hard flour for binding purposes and to improve the texture of the product. Then water is added and preferably also a suitable condiment, for example, sugar or salt or both, and the mixture is then kneaded and baked, the baking preferably being effected in a quick oven. The baked product is thus rendered frangible, digestible and also sterile and non-hygroscopic. After the baking operation the baked product may, if desired, be ground into the form of meal.

Prior to the addition of the ground peanut cake to the ground maize the bran or husk may be removed from the latter. As it is well known, in making foods for human consumption which contain maize, to remove the germ from the latter to prevent the food becoming heated, rancid and dark, I may, in making such foods, remove the greater part of the germ as well as the husk from the whole maize.

The food products according to the present invention thus comprise a baked mixture of ground maize (ground without or with the cob) and of ground peanut cake from which has been expressed only the first expression of oil. When it is desired to produce a food for human consumption the said baked mixture will contain the following constituents in substantially the following proportions:—

Oil _____ 7% to 10%
Proteins _____ 18% to 25%
Carbohydrates _____ 45% to 55%

When it is desired to produce a food for animals, the percentage of oil will somewhat exceed the above maximum and the percentage of proteins will be at or somewhat lower than the above minimum.

The baked product may be in the form of a biscuit or the like or it may be in the form of meal for making porridge or the like.

Two examples of food products according to the present invention are as follows:—

Example I (for human consumption): To substantially 35 parts ground maize, substantially 32 to 33 parts ground peanut cake containing substantially 20% to 25% oil and substantially 30% to 35% protein are added, and also substantially 25 parts hard flour. As a condiment substantially 1 part salt and substantially 1 part sugar are employed. Water is added and the whole mixture is kneaded and baked in a quick oven.

Example II (for dogs and other animals): To substantially 60 parts ground maize-on-cob meal, substantially 35 parts ground peanut cake containing substantially 25% oil and substantially 30% protein are added, and also substantially 5 parts hard flour, and a trace of salt. Water is added and the whole mixture is kneaded and baked in a quick oven.

It will be seen that the new food products for human consumption have a very high percentage of fat and protein contents and it will be readily understood that on this food human beings are able to do the heaviest work. The products for animals are also excellent and cheap foods.

What I claim as my invention and desire to secure by Letters Patent is:—

1. Process for producing food products, comprising grinding maize, adding to the ground maize ground peanut cake from which has been expressed only the first expression of oil, adding flour, adding water, kneading the mixture and baking the same.

2. Process for producing food products, comprising grinding maize without the cob, adding to the ground maize ground peanut cake from which has been expressed only the first expression of oil, adding flour, adding water, kneading the mixture and baking the same.

3. Process for producing food products, comprising grinding maize, adding to the ground maize ground peanut cake from which has been expressed only the first expression of oil, adding flour, adding water, kneading the mixture and baking the same in a quick oven.

4. Process for producing food products, comprising grinding maize, adding to the ground maize ground peanut cake from which has been expressed only the first expression of oil, adding flour, adding water, kneading the mixture and baking the same, and in grinding the baked product into meal.

5. Process for producing food products, comprising grinding whole maize without the cob, removing the husk and the greater part of the germ, adding to the ground maize ground peanut cake from which has been expressed only the first expression of oil, adding flour, adding water, kneading the mixture and baking the same.

6. A food product comprising ground maize and ground peanut cake from which has been expressed only the first expression of oil, said product containing substantially 7% to 10% oil, 18% to 25% proteins and 45% to 55% carbohydrates.

In testimony whereof I have signed my name to the specification in the presence of two subscribing witnesses.

S. GOLDREICH.

Witnesses:
A. GOLDBERG,
F. G. HACKNEY.